(12) United States Patent
Hayasaka et al.

(10) Patent No.: US 11,923,572 B2
(45) Date of Patent: Mar. 5, 2024

(54) FUEL CELL MODULE

(71) Applicant: DENSO CORPORATION, Kariya (JP)

(72) Inventors: Atsushi Hayasaka, Kariya (JP); Yuuki Mukoubara, Kariya (JP); Takashi Ojiro, Kariya (JP); Yasuhiro Osada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/724,765

(22) Filed: Apr. 20, 2022

(65) Prior Publication Data

US 2022/0246954 A1    Aug. 4, 2022

Related U.S. Application Data

(63) Continuation of application No. PCT/JP2020/038776, filed on Oct. 14, 2020.

(30) Foreign Application Priority Data

Nov. 27, 2019  (JP) .................................. 2019-214232

(51) Int. Cl.
*H01M 8/04014* (2016.01)
*H01M 8/04029* (2016.01)
*H01M 8/2465* (2016.01)
*H01M 8/2475* (2016.01)

(52) U.S. Cl.
CPC ... *H01M 8/04029* (2013.01); *H01M 8/04014* (2013.01); *H01M 8/2465* (2013.01); *H01M 8/2475* (2013.01)

(58) Field of Classification Search
CPC ......... H01M 8/04029; H01M 8/04014; H01M 8/2465; H01M 8/2475; H01M 8/243
See application file for complete search history.

(56) References Cited

U.S. PATENT DOCUMENTS

2008/0020247 A1*  1/2008  Valensa ................. H01M 8/004
                                                          429/444

FOREIGN PATENT DOCUMENTS

| JP | 2011113829 A | 6/2011 |
| JP | 2015018622 A | 1/2015 |
| JP | 2018120653 A | 8/2018 |

* cited by examiner

*Primary Examiner* — Eugenia Wang
(74) *Attorney, Agent, or Firm* — Harness, Dickey & Pierce, P.L.C.

(57) ABSTRACT

A fuel cell module includes a container and a plurality of cell members radially arranged inside the container. Inside the container, a first fluid flow path through which a first fluid that exchanges heat with an inner portion of the plurality of cell members flows is formed, and a second fluid flow path through which a second fluid that exchanges heat with an outer portion of the plurality of cell members flows is formed. A first heat exchange portion that forms the first fluid flow path and exchanges heat with the cell member has a smaller heat transfer area with the cell member than a second heat exchange portion that forms the second fluid flow path and exchanges heat with the cell member. The first fluid having a larger temperature difference with the cell member than the second fluid flows in the first fluid flow path.

6 Claims, 11 Drawing Sheets

FUEL CELL MODULE

CROSS REFERENCE TO RELATED APPLICATIONS

This application is a continuation application of International Patent Application No. PCT/JP2020/038776 filed on Oct. 14, 2020, which designated the U.S. and based on and claims the benefits of priority of Japanese Patent Application No. 2019-214232 filed on Nov. 27, 2019. The entire disclosure of all of the above applications is incorporated herein by reference.

TECHNICAL FIELD

The present disclosure relates to a fuel cell module.

BACKGROUND

In recent years, as a next-generation energy source, a fuel cell module capable of obtaining electricity by using a fuel gas containing hydrogen and an oxidant gas containing oxygen has been proposed.

SUMMARY

An object of the present disclosure is to provide a fuel cell module capable of reducing the temperature distribution between the inner portion and the outer portion of a plurality of cells arranged radially.

According to one aspect of the present disclosure, a fuel cell module includes a container, and a plurality of cell members arranged radially inside the container.

Inside the container, a first fluid flow path through which a first fluid that exchanges heat with an inner portion of the cell member flows is formed when a plurality of cell members are arranged radially, and a second fluid flow path through which a second fluid that exchanges heat with an outer portion of the cell member flows is formed when a plurality of cell members are arranged radially.

A first heat exchange portion that forms the first fluid flow path and exchanges heat with the cell member has a smaller heat transfer area with the cell member than a second heat exchange portion that forms the second fluid flow path and exchanges heat with the cell member.

The first fluid having a higher flow velocity than the second fluid flowing through the second fluid flow path flows in the first fluid flow path.

DETAILED DESCRIPTION

Figure 1:
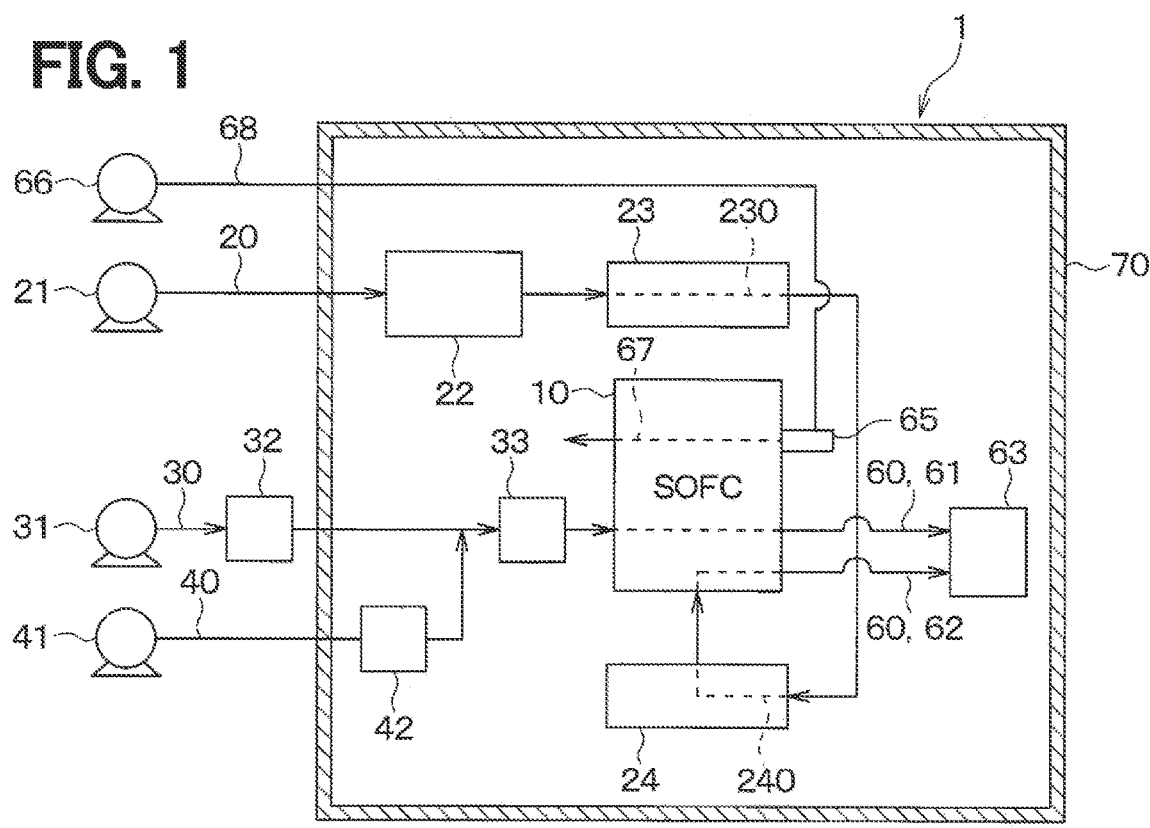
FIG. 1 is a schematic configuration diagram of a fuel cell system including a fuel cell module according to a first embodiment.

In an assumable example, a fuel cell module is disclosed. In such a fuel cell module, a raw fuel gas passage is provided in a central portion of a cylindrical container so as to extend in an axial direction, an intermediate portion of the raw fuel gas passage is expanded in a cylindrical shape to form a reformer, and an end portion of the raw fuel gas passage is expanded into a cylindrical shape to form a manifold. In the fuel cell module, a plurality of cells are radially arranged so as to surround the raw fuel gas passage in a region between the reformer and the manifold.

The cells are arranged in a radial pattern and the reformer and the manifold are arranged at both ends of the cells. So, it is explained that a temperature distribution of the cell stack can be made uniform. Patent Document 1 seems to explain the temperature distribution of each cell at both ends of the cell stack.

However, only a homogenization of the temperature distribution of each cell at both ends of the cell stack is examined, and the temperature distribution between an inner portion and an outer portion of the cell is not considered at all. An expansion of the temperature distribution between the inner portion and the outer portion of the cell causes a decrease in power generation efficiency and a decrease in durability of the fuel cell. The temperature distribution between the inner portion and the outer portion occurs in a case where the plurality of cells are arranged radially, and also in a case where the plurality of cell stacks are arranged radially.

An object of the present disclosure is to provide a fuel cell module capable of reducing the temperature distribution between the inner portion and the outer portion of a plurality of cells arranged radially.

According to one aspect of the present disclosure, a fuel cell module includes a container, and a plurality of cell members arranged radially inside the container.

Inside the container, a first fluid flow path through which a first fluid that exchanges heat with an inner portion of the cell member flows is formed when a plurality of cell members are arranged radially, and a second fluid flow path through which a second fluid that exchanges heat with an outer portion of the cell member flows is formed when a plurality of cell members are arranged radially.

A first heat exchange portion that forms the first fluid flow path and exchanges heat with the cell member has a smaller heat transfer area with the cell member than a second heat exchange portion that forms the second fluid flow path and exchanges heat with the cell member.

The first fluid having a larger temperature difference with the cell member than the second fluid flowing through the second fluid flow path flows in the first fluid flow path.

In this way, since the first fluid having a larger temperature difference from the cell member than the second fluid flows in the first fluid flow path, which has a smaller heat transfer area with the cell member than the second fluid flow path, a difference between the amount of heat transfer due to convection inside the cell member and the amount of heat transfer due to convection outside the cell member becomes small. As a result, it is possible to reduce the temperature distribution between the inner portion and the outer portion of the cell member.

According to another aspect of the present disclosure, a fuel cell module includes a container, and a plurality of cell members arranged radially inside the container.

Inside the container, a first fluid flow path through which a first fluid that exchanges heat with an inner portion of the cell member flows is formed when a plurality of cell members are arranged radially, and a second fluid flow path through which a second fluid that exchanges heat with an outer portion of the cell member flows is formed when a plurality of cell members are arranged radially.

A first heat exchange portion that forms the first fluid flow path and exchanges heat with the cell member has a smaller heat transfer area with the cell member than a second heat exchange portion that forms the second fluid flow path and exchanges heat with the cell member.

The first fluid having a higher flow velocity than the second fluid flowing through the second fluid flow path flows in the first fluid flow path.

In this way, since the first fluid having a flow velocity larger than that of the second fluid flows in the first fluid flow path having a smaller heat transfer area with the cell member than the second fluid flow path, a heat transfer coefficient of the first fluid flow path is larger than a heat transfer coefficient of the second fluid flow path. According to this configuration, the difference between the amount of heat transfer due to convection in the inner portion of the cell member and the amount of heat transfer due to convection in the outer portion becomes small, and it is possible to reduce the temperature distribution between the inner portion and the outer portion of the cell member.

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The respective embodiments described herein may be partially combined with each other as long as no particular problems are caused even without explicit statement of these combinations.

First Embodiment

The present embodiment will be described with reference to FIGS. 1 to 8. In the present embodiment, as shown in FIG. 1, an example in which a fuel cell module 1 of the present disclosure is applied to a fuel cell system including a solid oxide fuel cell 10 will be described.

The fuel cell module 1 is a hot module that includes a fuel processing system and a battery system, and keeps both of the systems at a high temperature by covering them with a heat insulating material. The fuel cell module 1 includes a solid oxide fuel cell 10, an air preheater 22, a water evaporator 42, a reformer 33, a combustor 63, and a container 70.

The solid oxide fuel cell 10 is also generally called SOFC (abbreviation for Solid Oxide Fuel Cell) and has an operating temperature of a high temperature (for example, 500° C. to 1000° C.). The fuel cell 10 has a plurality of cells C that output electric energy by an electrochemical reaction of a fuel gas and an oxidant gas (oxygen in the air in the present embodiment).

Figure 2:
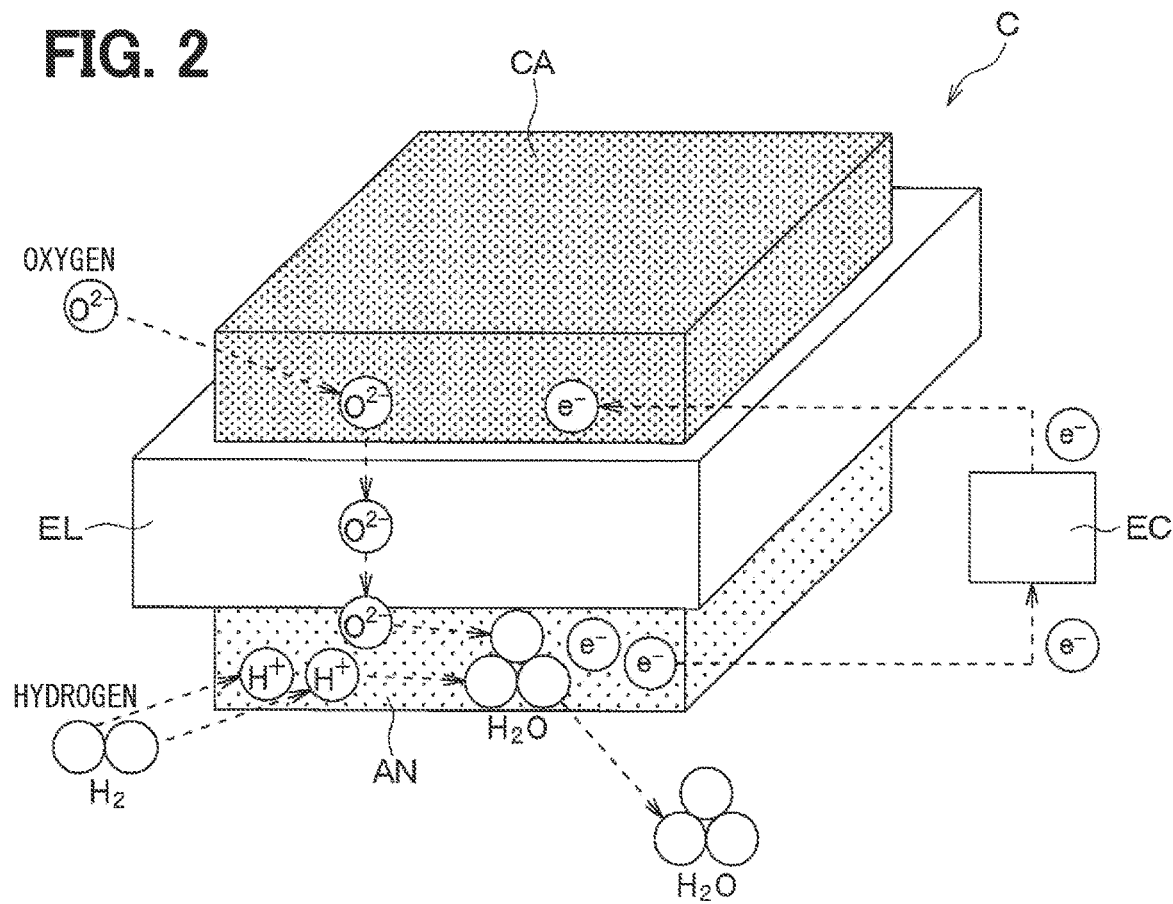
FIG. 2 is an explanatory diagram for explaining an electrochemical reaction inside a cell.

As shown in FIG. 2, a cell C includes an electrolyte EL, an air electrode (that is, a cathode) CA, and a fuel electrode (that is, an anode) AN. Cell C uses hydrogen and carbon monoxide as fuel gas. This fuel gas is produced by reforming city gas (that is, a gas containing methane as a main component), which is a raw material for reforming.

The reforming raw material used may be a gas other than city gas as long as it is a hydrocarbon-based gas.

The cell C outputs electric energy to an external circuit EC by the electrochemical reaction of hydrogen and oxygen shown in the following reaction formulas F1 and F2.

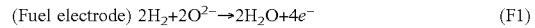

$$\text{(Fuel electrode) } 2H_2 + 2O^{2-} \rightarrow 2H_2O + 4e^- \tag{F1}$$

$$\text{(Air electrode) } O_2 + 4e^- \rightarrow 2O^{2-} \tag{F2}$$

Further, the cell C outputs electric energy to the external circuit EC by the electrochemical reaction of carbon monoxide and oxygen shown in the following reaction formulas F3 and F4.

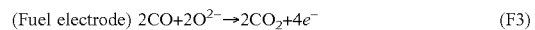

$$\text{(Fuel electrode) } 2CO + 2O^{2-} \rightarrow 2CO_2 + 4e^- \tag{F3}$$

$$\text{(Air electrode) } O_2 + 4e^- \rightarrow 2O^{2-} \tag{F4}$$

Figure 3:
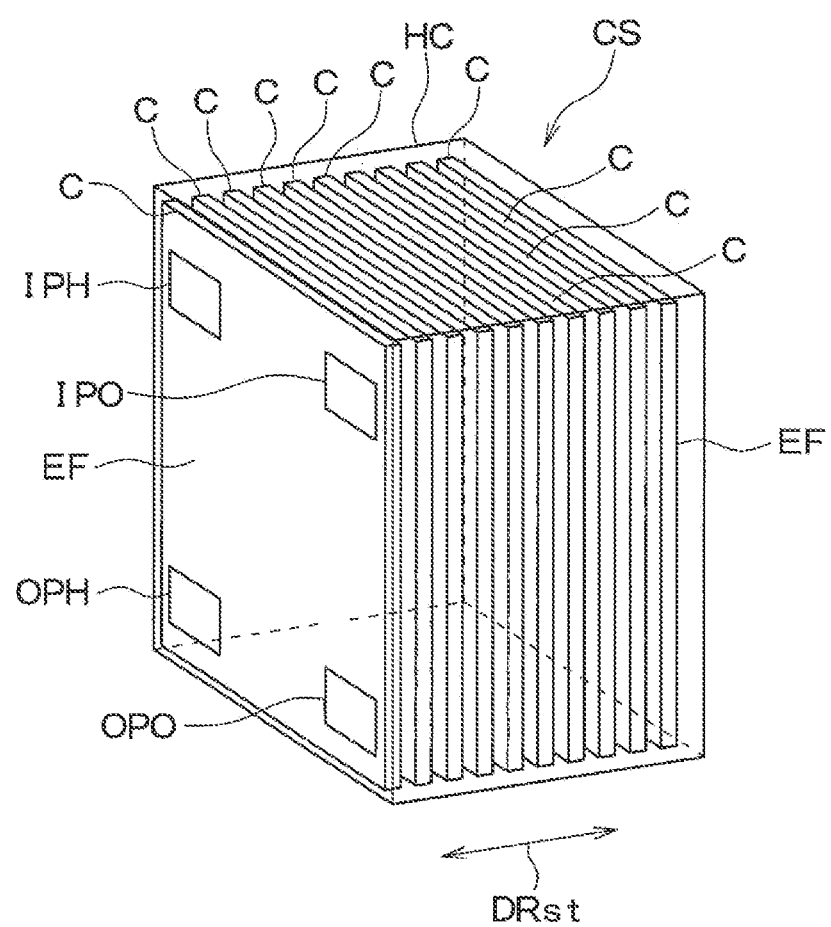
FIG. 3 is a schematic perspective view of a cell stack of the first embodiment.

In the fuel cell 10, a cell stack is configured by stacking a predetermined number of cells C, and a plurality of the cell stacks CS are provided. As shown in FIG. 3, in the cell stack CS, flat plate type cells C are stacked in a predetermined stacking direction DRst. A predetermined number of cells C constituting the cell stack CS are electrically connected in series. In the present embodiment, the cell stack CS corresponds to a cell member.

In the cell stack CS, a laminated body in which a predetermined number of cells C are laminated in a row is held by a holder HC. The holder HC is a member that maintains a laminated state of a predetermined number of cells C.

In the cell stack CS, on one of a laminated end surface EF located at an end of the stacking direction DRst of the cell C, an introduction port IPH for the fuel gas, a fuel gas introduction port IPH, a fuel gas outlet OPH, and an oxidant gas outlet OPO are formed. In the present embodiment, the introduction port IPH and the introduction port IPO correspond to each of a fuel gas inlet and an oxidant gas inlet.

The fuel cell 10 configured as described above is arranged inside the container 70 having heat insulating properties together with the air preheater 22, the reformer 33, the water evaporator 42, the combustor 63, and the like. An arrangement of the fuel cell 10 inside the container 70 will be described later.

Returning to FIG. 1, the fuel cell 10 is connected to an air path 20 which is an air distribution path. The air path 20 is composed of pipes and the like. In the air path 20, a pressure feed blower 21 that pumps air to the fuel cell 10, the air preheater 22 that heats the air supplied to the fuel cell 10, a first battery temperature controller 23, and a second battery temperature controller 24 are provided.

The pressure feed blower 21 is an oxidant pump that sucks air in the atmosphere and supplies it to the fuel cell 10. The pressure feed blower 21 is composed of an electric blower whose operation is controlled by a control signal from a control device (not shown).

Here, the control device of the fuel cell system is composed of a computer including a processor and a memory, and peripheral circuits thereof. The control device performs various calculations and processes based on a control program stored in the memory, and controls the operation of various control devices connected to an output side.

The air preheater 22 is a heat exchanger that heats the air pumped from the pressure feed blower 21 by exchanging heat with a combustion gas generated by the combustor 63. The air preheater 22 reduces a temperature difference between the air supplied to the fuel cell 10 and the fuel gas so as to improve the power generation efficiency of the fuel cell 10.

The first battery temperature controller 23 is a heat exchanger that adjusts the temperature of the fuel cell 10 by exchanging heat with the fuel cell 10 using the air heated through the air preheater 22 as a first fluid. The first battery temperature controller 23 functions as an endothermic device that absorbs heat from the fuel cell 10 that has been heated by self-heating associated with power generation. The first battery temperature controller 23 also functions as a preheater that heats the air supplied to the fuel cell 10 by the heat of the fuel cell 10. Specifically, the first battery temperature controller 23 is arranged around the fuel cell 10. The first battery temperature controller 23 has a first temperature control flow path 230 through which air as the first fluid flows. The first battery temperature controller 23 of the present embodiment is integrally configured with a battery container 71 described later.

The second battery temperature controller 24 is a heat exchanger that adjusts the temperature of the fuel cell 10 by exchanging heat with the fuel cell 10 using the air heated through the first battery temperature controller 23 as a second fluid. The second battery temperature controller 24 functions as an endothermic device that absorbs heat from the fuel cell 10 that has been heated by self-heating associated with power generation. The second battery temperature controller 24 also functions as a preheater that heats the air supplied to the fuel cell 10 by the heat of the fuel cell 10. Specifically, the second battery temperature controller 24 is arranged around the fuel cell 10. The second battery temperature controller 24 has a second temperature control flow path 240 through which air as the second fluid flows. The second battery temperature controller 24 of the present embodiment is integrally configured with the battery container 71 described later.

Further, the fuel cell 10 is connected to a fuel path 30 which is a distribution channel for reforming raw materials and fuel gas. The fuel path 30 is composed of pipes and the like. A fuel pump 31, a desulfurizer 32, and the reformer 33 are provided in the fuel path 30 in this order from an upstream side.

The fuel pump 31 is a pump for supplying a reforming raw material toward the fuel cell 10 side. The fuel pump 31 is composed of an electric pump whose operation is controlled by a control signal from a control device.

The desulfurizer 32 is a device for removing a sulfur component contained in the reforming raw material supplied from the fuel pump 31. The city gas contains an odorant (specifically, a sulfur component).

Since the sulfur component is a catalyst poisoning substance, it is necessary to remove it upstream from the reformer 33.

The reformer 33 reforms the reforming raw material supplied from the fuel pump 31 by using steam to generate fuel gas. The reformer 33 is configured to include, for example, a steam reforming catalyst containing a precious metal such as rhodium or ruthenium.

Specifically, the reformer 33 heats the mixed gas, which is a mixture of the reforming raw material and steam, by exchanging heat with the combustion gas. Fuel gas (hydrogen, carbon monoxide) is produced by the reforming reaction shown in a following reaction formula F5 and the shift reaction shown in a following reaction formula F6.

$$CH_4 + H_2O \rightarrow CO + H_2 \tag{F5}$$

$$CO + H_2O \rightarrow CO_2 + H_2 \tag{F6}$$

Here, the steam reforming in the reformer 33 is an endothermic reaction, and has a characteristic that the reforming rate is improved under high temperature conditions. Therefore, it is desirable that the reformer 33 is arranged around the fuel cell 10 so that the heat released to the surroundings (that is, radiant heat) during power generation of the fuel cell 10 can be absorbed.

A water supply path 40 is connected to the fuel path 30 between the fuel pump 31 and the reformer 33. The water supply path 40 is provided with a water pump 41 and the water evaporator 42. The water pump 41 is a pump that supplies water to the water evaporator 42. The water pump 41 is composed of an electric pump whose operation is controlled by a control signal from a control device. The water evaporator 42 has an evaporation function of converting water from the water pump 41 into steam (that is, a gas).

Further, the fuel cell 10 is connected to an off gas path 60 through which the off gas discharged from the fuel cell 10 flows. Specifically, the fuel cell 10 is connected to an air discharge path 61 through which the oxidant off gas discharged from the fuel cell 10 flows, and a fuel discharge path 62 through which the fuel off gas discharged from the fuel cell 10 flows.

The combustor 63 is connected to the off gas path 60. The combustor 63 generates the combustion gas that raises the temperature of the reformer 33 and the like by burning the fuel off gas and the like. For example, when the fuel cell 10 generates power, the combustor 63 generates the combustion gas for raising the temperature of each device of the fuel cell system by burning a mixed gas in which an oxidant off gas and a fuel off gas are mixed as a combustible gas. Although not shown, the combustor 63 has a burner for burning the fuel off gas. In the combustor 63, the ignition of the burner starts the combustion of the fuel off gas to generate the combustion gas.

A combustion gas path (not shown) for circulating high-temperature combustion gas is connected to the combustor 63. Although not shown, the combustion gas path is connected to the reformer 33, the air preheater 22, the water evaporator 42, etc. in order to effectively utilize the heat of the combustion gas flowing inside. An order of flowing the combustion gas to each device may be changed according to the amount of heat required by each device.

Here, the fuel cell module 1 is provided with a warm-up burner 65 for warming up the fuel cell 10 at the time of starting or the like, in addition to the combustor 63. The warm-up burner 65 burns a mixed gas of a part of the reforming raw material flowing through the fuel path 30 and the air blown from a starting blower 66 provided separately from the pressure feed blower 21 as a flammable fluid. The high-temperature warm-up gas generated by the combustion of the flammable fluid is supplied to a warm-up gas flow path 67 provided inside the fuel cell 10.

The warm-up gas flow path 67 is connected to a blower air flow path 68 for air blown from the starting blower 66. As a result, the warm-up gas flow path 67 can flow not only the flammable fluid but also a part of the air blown from the starting blower 66 as a temperature-controlled air.

The fuel cell 10, the air preheater 22, the reformer 33, the water evaporator 42, and the combustor 63 are arranged inside the heat-insulating container 70. The container 70 forms an outer shell of the fuel cell module 1. Although not shown, the air preheater 22, the reformer 33, and the water evaporator 42 are arranged around the combustor 63 inside the container 70 so as to receive the heat of the combustor 63. On the other hand, the fuel cell 10 is arranged in another space insulated from the space in which the air preheater 22, the reformer 33, the water evaporator 42, the combustor 63, etc. are accommodated so as not to directly receive the heat of the combustor 63.

Figure 4:
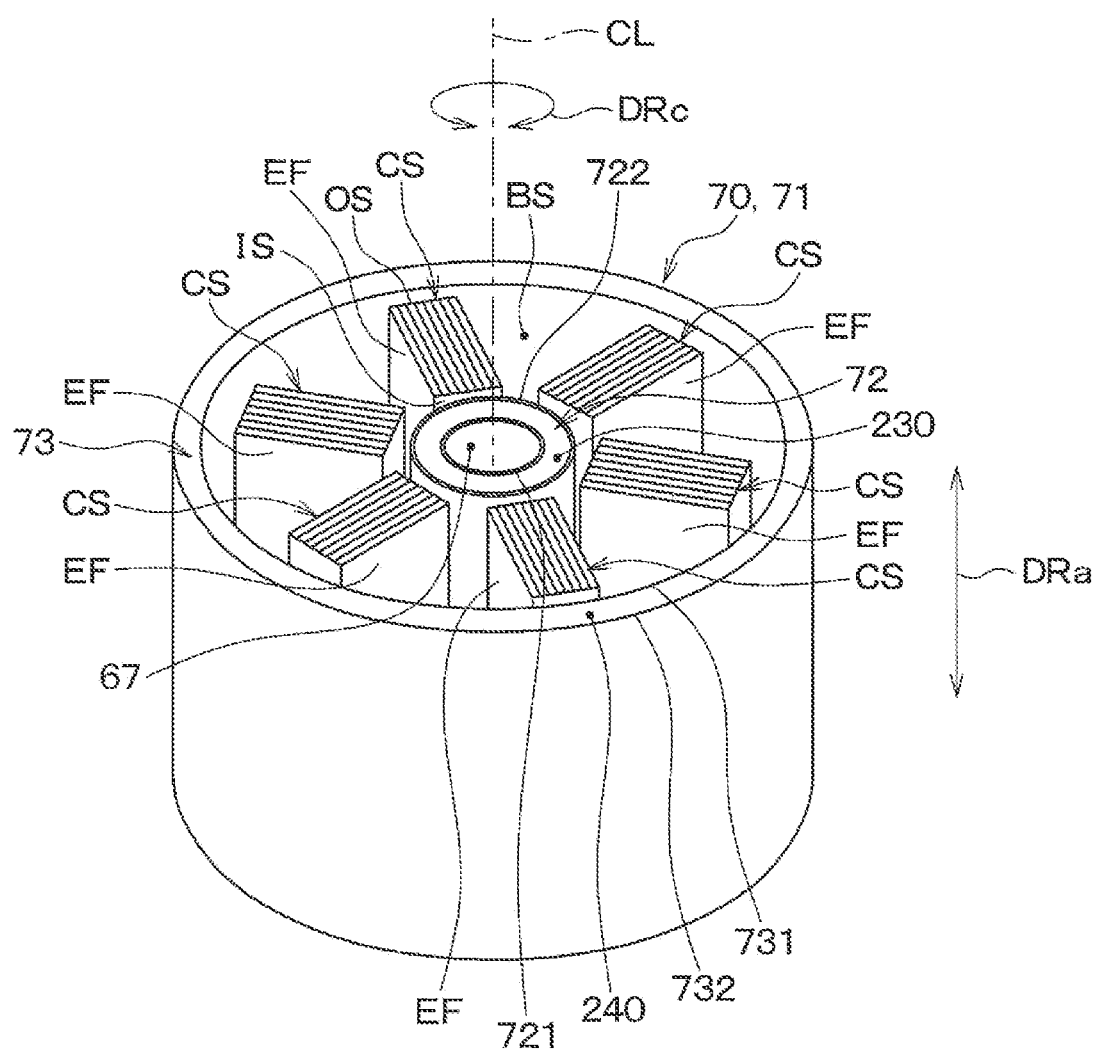
FIG. 4 is a schematic perspective view showing an arrangement form of the cell stack inside a battery container.
Figure 5:
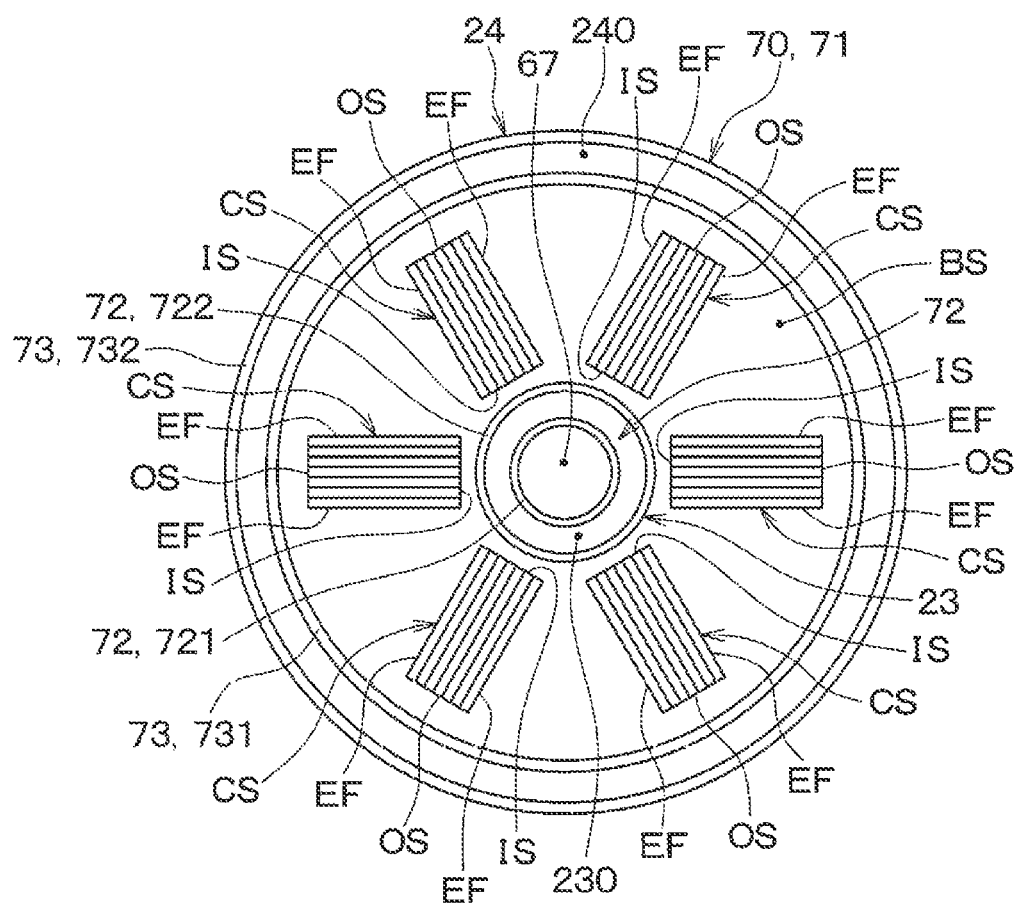
FIG. 5 is a schematic plan view showing an arrangement form of the cell stack inside a battery container.

As shown in FIGS. 4 and 5, the container 70 has the battery container 71 for accommodating the fuel cell 10. The battery container 71 has a double cylinder structure, and a donut-shaped battery storage space BS is formed inside. The battery container 71 is arranged in such a posture that an axial center CL of the battery container 71 extends along a direction in which gravity acts (that is, a vertical direction).

In the present embodiment, a direction extending along the axis CL of the battery container 71 is defined as an axial direction DRa, a direction passing through the axis CL of the battery container 71 and orthogonal to the axial direction DRa is defined as a radial direction DRr, and a direction along a circle centered on the axis CL of the battery container 71 is defined as a circumferential direction DRc.

In the battery storage space BS inside the battery container 71, a plurality of cell stacks CS are radially arranged around the axis CL of the battery container 71. In other words, the plurality of cell stacks CS are arranged at equal intervals in the circumferential direction DRc in the battery accommodating space BS inside the container 70. The intervals of the circumferential DRc in the plurality of cell stacks CS do not have to be the same, and some of them may be different from others.

Among the plurality of cell stacks CS, the cell stacks CS adjacent to each other in the circumferential direction DRc are arranged in such a posture that the laminated end surfaces EF face each other. In other words, the stacked end surfaces EF of the cell stacks CS adjacent to each other in the circumferential direction DRc face each other in the circumferential DRc with a predetermined interval.

Further, in the plurality of cell stacks CS, a part of the side surface extending along the stacking direction DRst faces the inside of the battery container 71 as an inner side surface IS, and a part of the other side surface faces the outside of the battery container 71 as an outer surface OS.

The inner side surface IS of the cell stack CS constitutes an inner portion of the cell stack CS when a plurality of cell stacks CS are radially arranged inside the container 70. Further, the outer surface OS of the cell stack CS constitutes an outer portion of the cell stack CS when a plurality of cell stacks CS are radially arranged inside the container 70.

Figure 6:
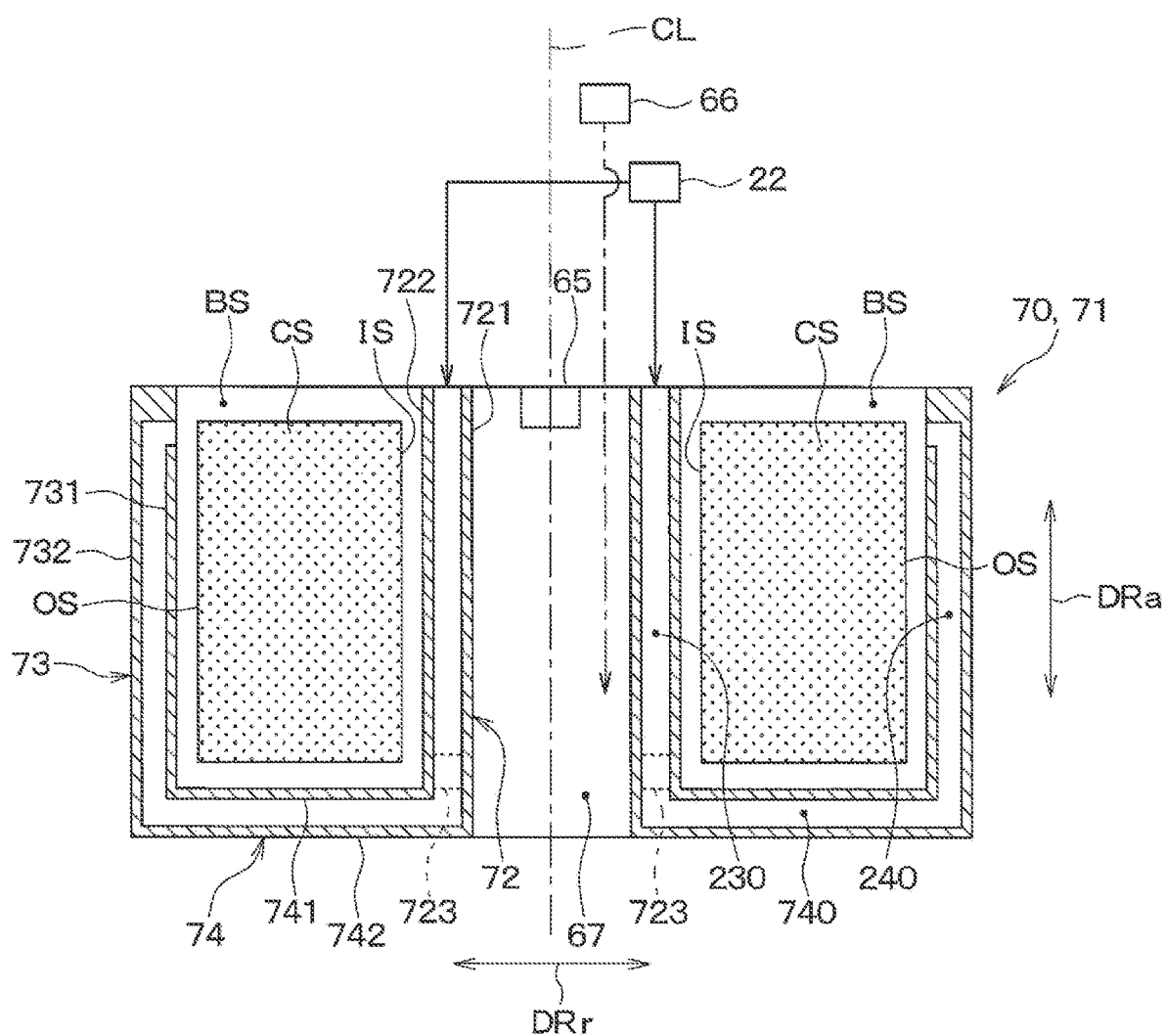
FIG. 6 is a schematic cross-sectional view of a battery container accommodating the cell stack according to the first embodiment.

As shown in FIG. 6, the battery container 71 of the present embodiment has an inner cylinder 72, an outer cylinder 73 located outside the inner cylinder 72, a base plate 74 connecting a bottom of the inner cylinder 72 and a bottom of the outer cylinder 73 to each other.

The inner cylinder 72 is positioned inside the plurality of cell stacks CS in the battery container 71. The outer cylinder 73 is positioned outside the plurality of cell stacks CS in the battery container 71. A battery accommodating space BS is formed between the inner cylinder 72 and the outer cylinder 73. The inner cylinder 72 and the outer cylinder 73 are each formed in a cylindrical shape. The inner cylinder 72 and the outer cylinder 73 are arranged so that their central axes are coaxial with each other.

The inner cylinder 72 faces the inner side surface IS of the cell stack CS at a predetermined interval so as to receive the radiant heat of the cell stack CS. In the inner cylinder 72, a dimension in the axial direction DRa is larger than the dimension in the axial direction DRa of the cell stack CS so that the inner cylinder 72 can cover the entire inner side surface IS of the cell stack CS.

Further, the inner cylinder 72 has a double wall structure having a first inner wall 721 and a first outer wall 722 so that a fluid can pass therethrough. The first inner wall 721 and the first outer wall 722 are each composed of a cylindrical body.

The first inner wall 721 and the first outer wall 722 are arranged so that their central axes are coaxial with each other. A space defining portion such as a spacer or a dowel is provided between the first inner wall 721 and the first outer wall 722, and a substantially constant gap is formed by the space defining portion. Air that exchanges heat with the inner side surface IS of the cell stack CS is introduced as the first fluid into a gap flow path formed between the first inner wall 721 and the first outer wall 722.

Further, inside the first inner wall 721, the warm-up burner 65 is arranged on one side in the axial direction DRa, and a warm-up gas flow path 67 is formed on the other side in the axial direction DRa with respect to the warm-up burner 65.

The inner cylinder 72 is formed with an introduction path 723 for guiding the warm-up gas flow path 67 to the battery accommodating space BS. As a result, the gas flowing through the warm-up gas flow path 67 can be introduced into the battery accommodating space BS. In the present embodiment, the warm-up gas flow path 67 corresponds to a third fluid flow path through which the temperature-controlled air as a third fluid flows.

The outer cylinder 73 faces the outer surface OS of the cell stack CS at a predetermined interval so as to receive the radiant heat of the cell stack CS. In the outer cylinder 73, a dimension in the axial direction DRa is larger than the dimension in the axial direction DRa of the cell stack CS so that the inner cylinder 72 can cover the entire outer side surface OS of the cell stack CS.

The outer cylinder 73 has a double wall structure having a second inner wall 731 and a second outer wall 732 so that a fluid can pass therethrough. The second inner wall 731 and the second outer wall 732 are each configured as a cylindrical body.

The second inner wall 731 and the second outer wall 732 are arranged so that their central axes are coaxial with each other. A space defining portion such as a spacer or a dowel is provided between the second inner wall 731 and the second outer wall 732, and a substantially constant gap is formed by the space defining portion. Air that exchanges heat with the outer surface OS of the cell stack CS is introduced as a second fluid into the gap flow path formed between the second inner wall 731 and the second outer wall 732.

The base plate 74 connects the bottom of the inner cylinder 72 and the bottom of the outer cylinder 73, and has a donut-shaped shape. The base plate 74 supports a plurality of cell stacks CS via adapters (not shown).

The base plate 74 faces a lower surface of the cell stack CS. The base plate 74 has a size capable of covering the entire lower surface of the cell stack CS.

The base plate 74 has a double wall structure having an upper wall 741 and a lower wall 742 so that a fluid can pass therethrough. A space defining portion such as a spacer or a dowel is provided between the upper wall 741 and the lower wall 742, and a substantially constant gap is formed by the space defining portion.

In the base plate 74, the upper wall 741 is connected to the first outer wall 722 of the inner cylinder 72 and the second inner wall 731 of the outer cylinder 73, and the lower wall 742 is connected to the first inner wall 721 of the inner cylinder 72 and the second outer wall 732 of the outer cylinder 73. A communication passage 740 is formed between the upper wall 741 and the lower wall 742 to communicate the gap flow path of the inner cylinder 72 and the gap flow path of the outer cylinder 73.

Figure 7:
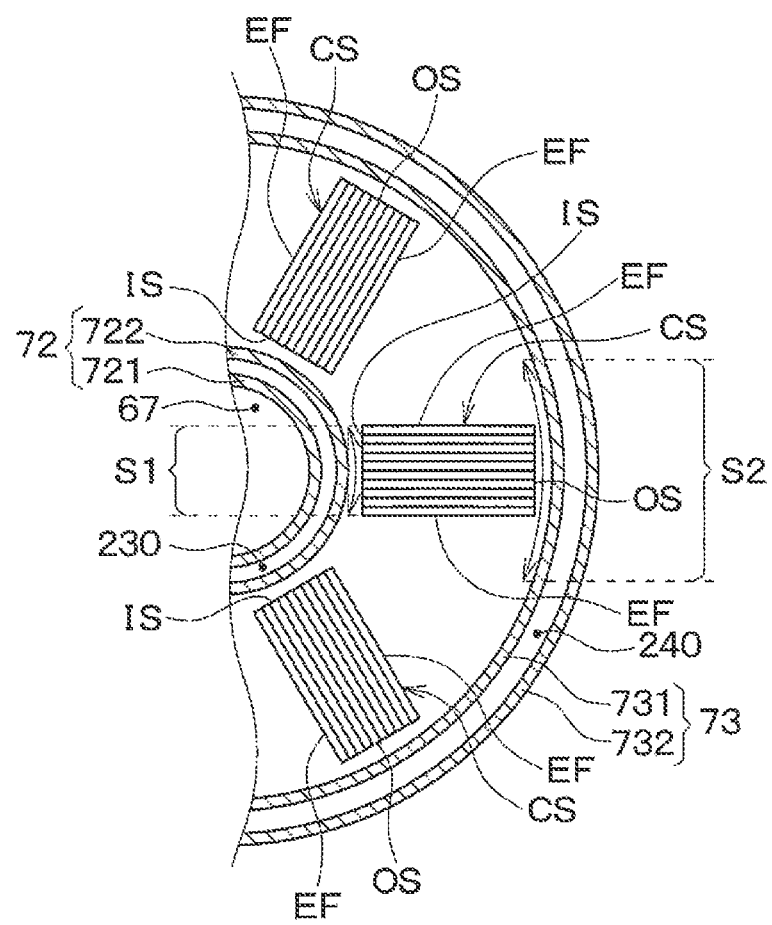
FIG. 7 is an explanatory diagram for explaining a heat transfer portion of each of a first battery temperature controller and a second battery temperature controller.

Here, the inner cylinder 72 has a larger curvature than the outer cylinder 73, and an area of the portion facing the cell stack CS is small. Therefore, in the inner cylinder 72, a heat transfer area S1 with the cell stack CS is smaller than a heat transfer area S2 with the cell stack CS in the outer cylinder 73, as shown in FIG. 7.

In the battery container 71, when the heat transfer area is different between the inside and the outside, if a fluid having the same temperature and the same flow velocity flows through the gap flow path formed in the inner cylinder 72 and the gap flow path formed in the outer cylinder 73, the amount of heat transfer due to convection is smaller on the inner side than on the outer side of the cell stack CS. This difference in the amount of heat transfer causes the temperature distribution between the inner portion and the outer portion of the cell stack CS to expand. Such an expansion of the temperature distribution is not preferable because it causes a decrease in power generation efficiency and a decrease in durability.

Therefore, the battery container 71 has a configuration in which a fluid having a larger temperature difference from the cell stack CS than the fluid flowing in the gap flow path formed in the outer cylinder 73 flows in the gap flow path formed in the inner cylinder 72. The battery container 71 of the present embodiment has a configuration in which a fluid having a lower temperature than the fluid flowing in the gap flow path formed in the outer cylinder 73 flows with respect to the gap flow path formed in the inner cylinder 72, when the cell stack CS needs to be cooled or kept warm. When it is necessary to cool or keep the cell stack CS warm, it is mainly during power generation of the fuel cell 10.

Specifically, in the battery container 71, the communication passage 740 is connected to a downstream side of the air flow of the gap flow path formed in the inner cylinder 72, and an upstream side of the air flow of the gap flow path formed in the outer cylinder 73. As a result, in the battery container 71, the air that has passed through the air preheater 22 flows through the gap flow path formed in the inner cylinder 72, and the air that has passed through the communication passage 740 flows through the gap flow path formed in the outer cylinder 73.

In the battery container 71 of the present embodiment, the inner cylinder 72 is configured as a first battery temperature controller 23, and the outer cylinder 73 is configured as a second battery temperature controller 24. Further, in the present embodiment, the gap flow path formed in the inner cylinder 72 is configured as a first temperature control flow path 230, and the gap flow path formed in the outer cylinder 73 is configured as a second temperature control flow path 240.

Here, in the present embodiment, the inner cylinder 72 corresponds to a first heat exchange portion provided in the container 70, and the first temperature control flow path 230 corresponds to a first fluid flow path through which air as the first fluid flows. Further, in the present embodiment, the outer cylinder 73 corresponds to a second heat exchange portion provided in the container 70, and the second temperature control flow path 240 corresponds to the second fluid flow path through which air as the second fluid flows. Hereinafter, the gap flow path formed in the inner cylinder 72 is referred to as a first temperature control flow path 230, and the gap flow path formed in the outer cylinder 73 is referred to as a second temperature control flow path 240.

The first temperature control flow path 230 extends from one side in the axial direction DRa to the other side. In the first temperature control flow path 230, air from the air preheater 22 flows in one direction from one side in the axial direction DRa to the other side. The air flowing into the first temperature control flow path 230 receives heat from the cell stack CS when passing through the first temperature control flow path 230 and raises the temperature.

Further, the second temperature control flow path 240 extends from the other side in the axial direction DRa to one side. In the second temperature control flow path 240, air from the communication passage 740 flows in one direction from one side in the axial direction DRa to the other side.

The air flowing into the second temperature control flow path 240 receives heat from the cell stack CS and raises the temperature when passing through the communication passage 740. Therefore, in the battery container 71, air having a temperature higher than that of the air flowing through the first temperature control flow path 230 flows into the second temperature control flow path 240. In other words, in the battery container 71, air having a temperature lower than that of the air flowing through the second temperature control flow path 240 flows into the first temperature control flow path 230.

Here, in the inner cylinder 72 and the outer cylinder 73 of the present embodiment, a distance between the first inner wall 721 and the first outer wall 722 and a distance between the second inner wall 731 and the second outer wall 732 are substantially the same. The inner cylinder 72 has a smaller radius of curvature than the outer cylinder 73. Therefore, the flow path cross-sectional area of the first temperature control flow path 230 is smaller than the flow path cross-sectional area of the second temperature control flow path 240.

According to the law of continuity, when a steady-state fluid flows through a non-branched flow path, the mass flow rates in any cross section of the flow path are equal. In the battery container 71 of the present embodiment, the first temperature control flow path 230 and the second temperature control flow path 240 are connected in series, and the flow path cross-sectional area of the first temperature control flow path 230 is smaller than the flow path cross-sectional area of the temperature control flow path 240. Therefore, air having a higher flow velocity than the air flowing through the second temperature control flow path 240 flows into the first temperature control flow path 230.

Next, a basic operation of the fuel cell system will be described. In the fuel cell system, when an operation switch (not shown) is turned on, a power generation process for outputting electric energy from the fuel cell 10 is executed by a control device.

In this power generation process, for example, the pressure feed blower 21, the fuel pump 31, and the water pump 41 are controlled so that the fuel cell 10 is supplied with the oxidant gas and the fuel gas in an amount suitable for power generation.

The reforming raw material discharged from the fuel pump 31 is mixed with steam in the water evaporator 42 and then flows into the reformer 33. In the reformer 33, when a mixed gas of the reforming raw material and steam is supplied, fuel gas (hydrogen, carbon monoxide) is generated by the reaction shown in the above-mentioned reaction formulas F5 and F6. Then, the fuel gas generated by the reformer 33 flows into the fuel cell 10.

Figure 8:
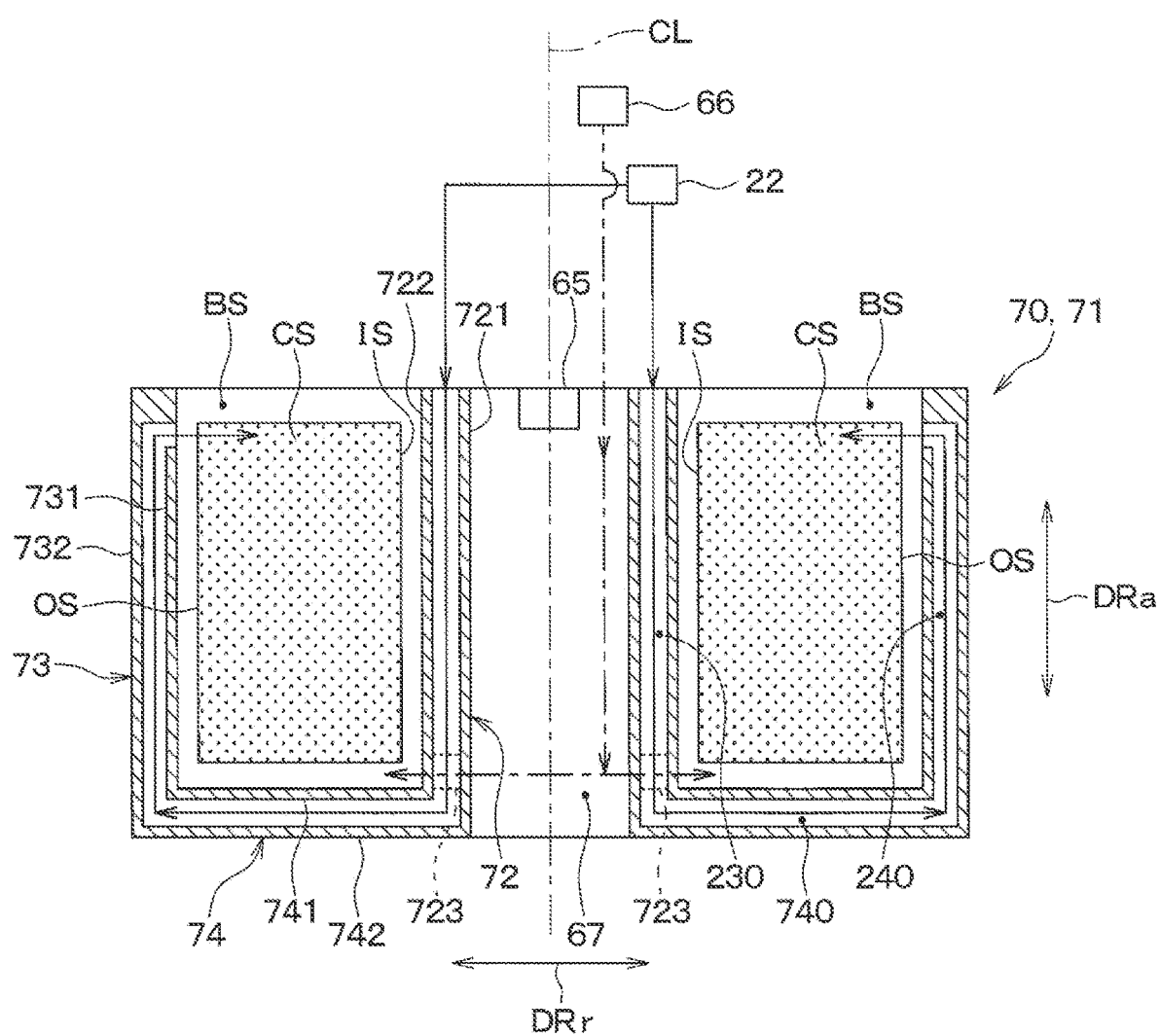
FIG. 8 is an explanatory diagram for explaining how air flows around the cell stack of the fuel cell module according to the first embodiment.

The oxidant gas blown out from the pressure feed blower 21 flows into the air preheater 22 and the temperature of the oxidant gas raises due to heat exchange with the combustion gas. Then, as shown in FIG. 8, the air that has passed through the air preheater 22 flows through the first temperature control flow path 230, the communication passage 740, and the second temperature control flow path 240 in this order. The air passing through the first temperature control flow path 230, the communication passage 740, and the second temperature control flow path 240 absorbs heat from the fuel cell 10 and rises to near the battery temperature of the fuel cell 10, and then flows into the fuel cell 10.

At this time, air having a low temperature and a high flow velocity flows through the first temperature control flow path 230, which has a smaller heat transfer area with the cell stack CS than the second temperature control flow path 240. According to this configuration, the difference between the amount of heat transfer due to convection inside the cell stack CS and the amount of heat transfer due to convection outside the cell stack CS becomes small, and the temperature distribution between the inner portion and the outer portion of the cell stack CS is reduced.

When the oxidant gas and the fuel gas are supplied, the fuel cell 10 outputs electric energy by the reactions shown in the above-mentioned reaction formulas F1 to F4. At this time, the fuel cell 10 discharges the off gas to the off gas path 60.

The off gas discharged from the fuel cell 10 is burned in the combustor 63 as the combustible gas. The combustion gas generated by the combustor 63 dissipates heat to the reformer 33, the air preheater 22, and the water evaporator 42 when flowing through a combustion gas path (not shown).

The fuel cell module 1 described above includes a battery container 71 having the inner cylinder 72 facing the inner portion of the cell stack CS and the outer cylinder 73 facing the outer portion of the cell stack CS. In the battery container 71, the first temperature control flow path 230 for flowing air that exchanges heat with the cell stack CS is formed in the inner cylinder 72, and the second temperature control flow path 240 for flowing air that exchanges heat with the cell stack CS in the outer cylinder 73 is formed. When the air passed through the first temperature control flow path 230 flows to the second temperature control flow path 240, in the battery container 71, the temperature difference between the air flowing through the first temperature control flow path 230 and the cell stack CS becomes larger than the temperature difference between the air flowing through the second temperature control flow path 240 and the cell stack CS.

According to this configuration, the air having a larger temperature difference from the cell stack CS than the air flowing through the second temperature control flow path 240 flows to the first temperature control flow path 230, which has a smaller heat transfer area with the cell stack CS than the second temperature control flow path 240.

In addition, in the battery container 71, the flow path cross-sectional area of the first temperature control flow path 230 is smaller than the flow path cross-sectional area of the second temperature control flow path 240. According to this configuration, the air having a higher flow velocity than the air in the second temperature control flow path 240 flows to the first temperature control flow path 230, which has a smaller heat transfer area with the cell stack CS than that of the second temperature control flow path 240. Therefore, the heat transfer coefficient of the first temperature control flow path 230 becomes larger than the heat transfer coefficient of the second temperature control flow path 240.

The difference between the amount of heat transfer due to convection inside the cell stack CS and the amount of heat transfer due to convection outside the cell stack CS becomes small, and the temperature distribution between the inner portion and the outer portion of the cell stack CS is reduced. As a result, it is possible to suppress a decrease in power generation efficiency and a decrease in durability due to the temperature distribution between the inner portion and the outer portion of the cell stack CS.

Among the plurality of cell stacks CS, the cell stacks CS adjacent to each other in the circumferential direction DRc are arranged in such a posture that the laminated end surfaces EF face each other. According to this configuration, since the laminated end surface EF of one of the adjacent cell stacks CS receives heat from the other cell stack CS, the temperature distribution of the stacking direction DRst in the cell stack CS can be reduced.

Further, the battery container 71 has the warm-up gas flow path 67 capable of flowing temperature-controlled air having a temperature different from that of the air flowing through the first temperature control flow path 230 inside the first temperature control flow path 230. That is, the battery container 71 has a flow path structure in which the warm-up gas flow path 67 is provided inside the first temperature control flow path 230. According to this configuration, for example, even when the calorific value of the cell stack CS increases due to deterioration over time, air having a lower temperature than the air flowing through the first temperature control flow path 230 flows to the warm-up gas flow path 67, so that it is possible to prevent the cell stack CS from being excessively heated.

Further, the fuel gas introduction port IPH and the fuel gas outlet OPH, and the oxidant gas introduction port IPO and the oxidant gas outlet OPO are formed between adjacent cell stacks CS among the plurality of cell stacks CS. According to this configuration, the fuel gas or the oxidant gas can be supplied by effectively utilizing the space formed between the adjacent cell stacks CS. According to this configuration, the size of the container 70 can be reduced as compared with the case where a space for supplying the fuel gas or the oxidant gas is separately provided.

Second Embodiment

Next, a second embodiment will be described with reference to FIG. 9. In the present embodiment, differences from the first embodiment will be mainly described.

Figure 9:
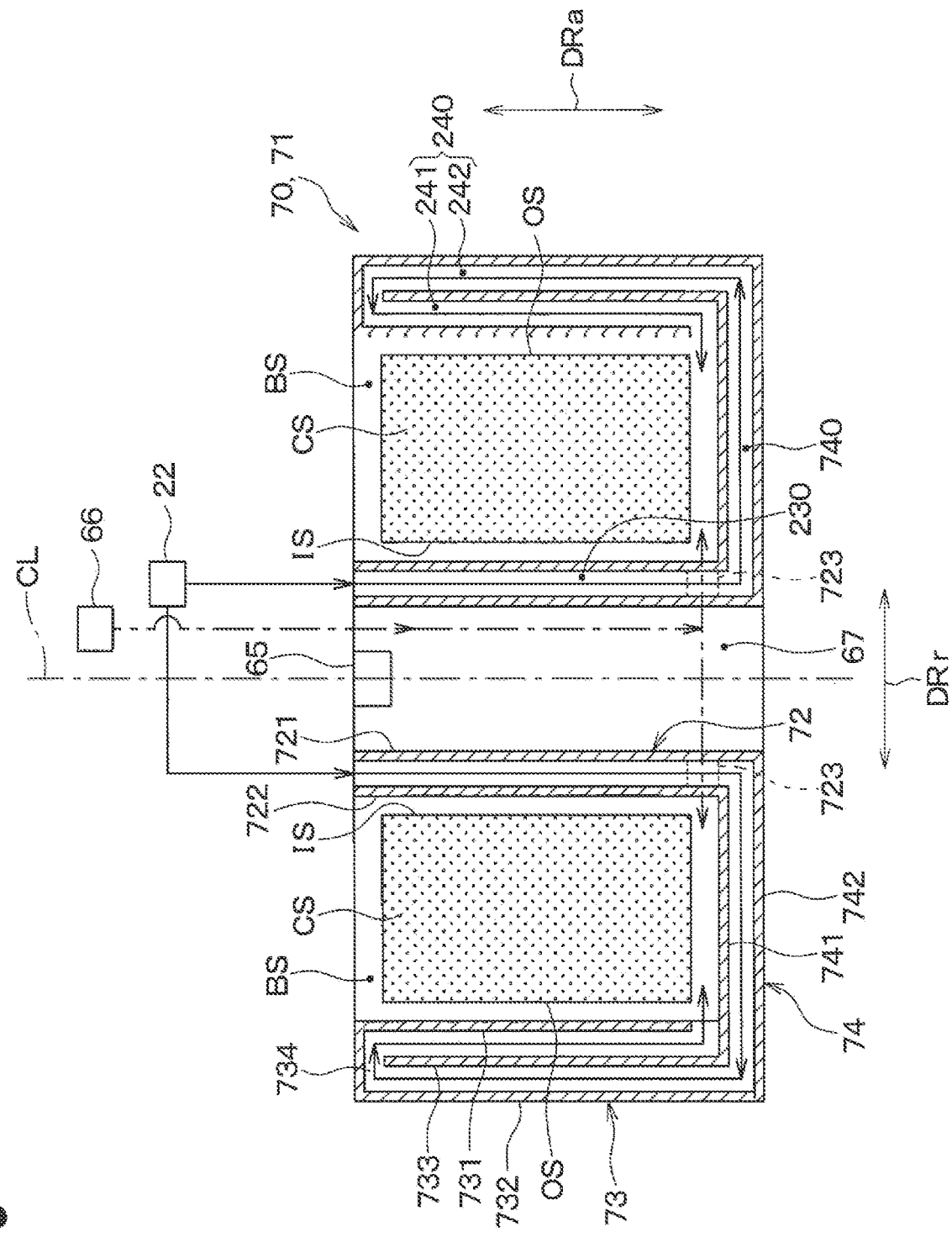
FIG. 9 is a schematic cross-sectional view of a battery container accommodating a cell stack according to a second embodiment.

As shown in FIG. 9, the second temperature control flow path 240 provided in the outer cylinder 73 has an inner flow path portion 241 closer to the cell stack CS and an outer flow path portion 242 distant from the cell stack CS with respect to the inner flow path portion 241. The second temperature control flow path 240 has a flow path structure in which the air that has passed through the outer flow path portion 242 is folded back and flows into the inner flow path portion 241.

Specifically, inside the outer cylinder 73, a separation plate 733 that divides the second temperature control flow path 240 into the inner flow path portion 241 and the outer flow path portion 242 is provided. The inner flow path portion 241 and the outer flow path portion 242 each extend along the axial direction DRa. One side of the outer flow path portion 242 in the axial direction DRa communicates with the inner flow path portion 241 via a folded portion 734, and the other side in the axial direction DRa communicates with the communication passage 740. One side of the inner flow path portion 241 in the axial direction DRa communicates with the outer flow path portion 242 via the folded portion 734, and the other side in the axial direction DRa is connected to the cell stack CS via a pipe or the like (not shown). In the second temperature control flow path 240, the flow path cross-sectional area of the inner flow path portion 241 is larger than the flow path cross-sectional area of the first temperature control flow path 230.

The rest of the structure is similar to that of the first embodiment. The fuel cell module 1 of the present embodiment can obtain the same action and effect as those of the first embodiment, which are common to or equivalent to those of the first embodiment.

Here, the second temperature control flow path 240 has a larger heat transfer area that receives heat from the cell stack CS than the first temperature control flow path 230. In this case, the temperature difference between the upstream and the downstream of the second temperature control flow path 240 becomes large, and there is a possibility that the temperature of the second temperature control flow path 240 becomes non-uniform.

On the other hand, since the second temperature control flow path 240 has a flow path structure in which air is folded back and flows, the air flows face each other in the inner flow path portion 241 and the outer flow path portion 242 of the second temperature control flow path 240. Therefore, the temperature in the inner flow path portion near the outer portion of the cell stack CS is made uniform. As a result, temperature unevenness in the outer portion of the cell stack CS is suppressed.

Modification of Second Embodiment

In the second embodiment, in the second temperature control flow path 240, the flow path cross-sectional area of the inner flow path portion 241 is larger than the flow path cross-sectional area of the first temperature control flow path 230. However, the second temperature control flow path 240 is not limited to this structure. The second temperature control flow path 240 of the second embodiment has a flow path structure in which air flows by folding back, and the flow velocity of air in the second temperature control flow path 240 tends to decrease as compared with the first temperature control flow path 230. If the second temperature control flow path 240 is configured so that air having a flow velocity smaller than that of the air flowing through the first temperature control flow path 230 flows, the cross-sectional area of the flow path may be smaller than the flow path cross-sectional area of the first temperature control flow path 230. The same also applies to the following embodiments.

Third Embodiment

Next, a third embodiment will be described with reference to FIG. 10. In the present embodiment, differences from the first embodiment will be mainly described.

Figure 10:
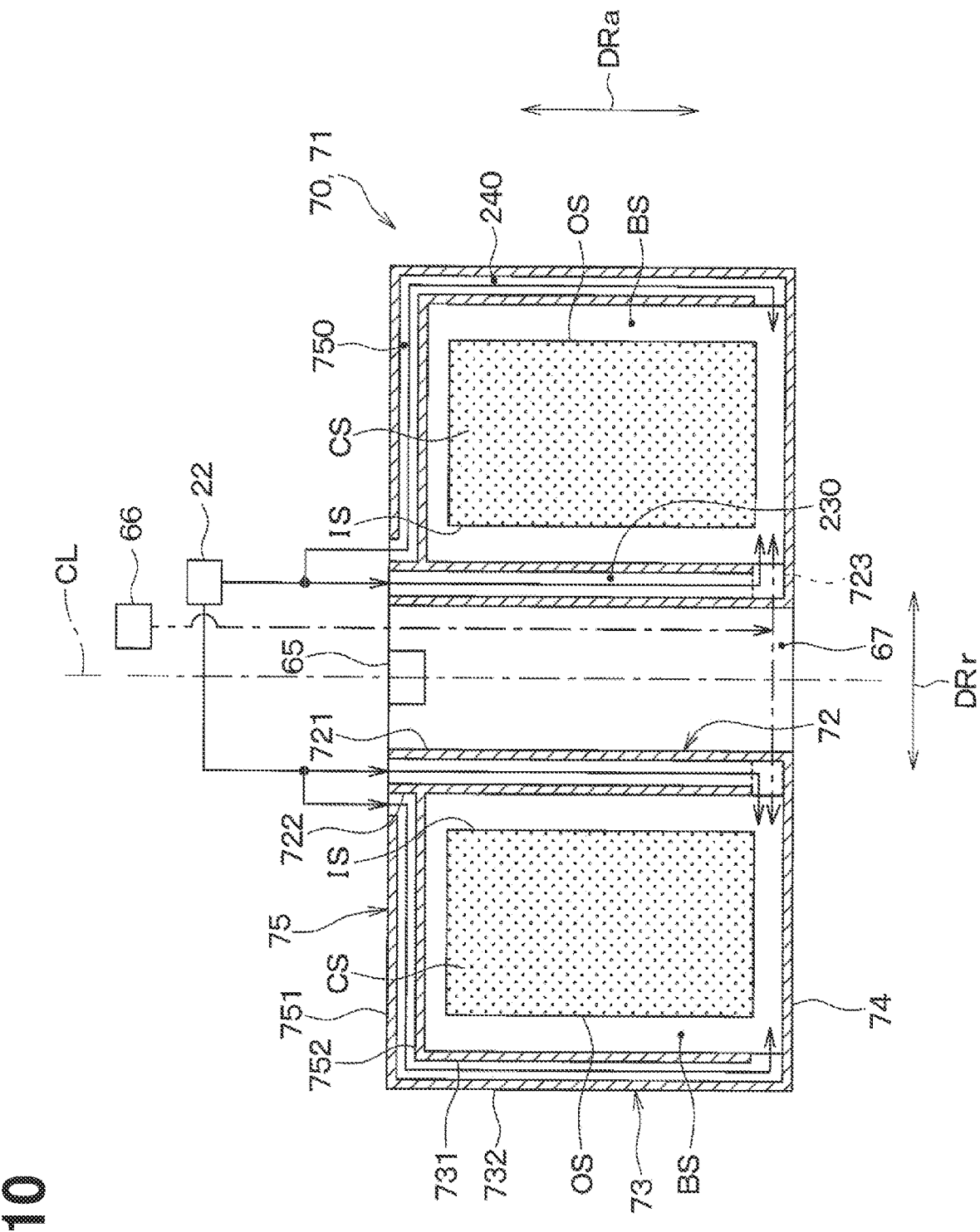
FIG. 10 is a schematic cross-sectional view of a battery container accommodating a cell stack according to a third embodiment.

As shown in FIG. 10, the battery container 71 has a roof plate 75 in addition to the inner cylinder 72, the outer cylinder 73, and the base plate 74. The base plate 74 has a single wall structure different from that of the first embodiment, and is not provided with the communication passage 740 described in the first embodiment.

The roof plate 75 is a plate that connects an upper part of the inner cylinder 72 and an upper part of the outer cylinder 73, and has a donut shape. The roof plate 75 faces an upper surface of the cell stack CS at a predetermined interval. The roof plate 75 has a size capable of covering the entire upper surface of the cell stack CS.

The roof plate 75 has a double wall structure having an upper wall 751 and a lower wall 752 so that a fluid can pass therethrough. A space defining portion such as a spacer or a dowel is provided between the upper wall 751 and the lower wall 752, and a substantially constant gap is formed by the space defining portion.

In the roof plate 75, the upper wall 751 is connected to the second outer wall 732 of the outer cylinder 73, and the lower wall 752 is connected to the first outer wall 722 of the inner cylinder 72 and the second inner wall 731 of the outer cylinder 73. A communication passage 750 communicating with the gap flow path of the outer cylinder 73 is formed between the upper wall 751 and the lower wall 752.

An upstream side of the air flow of the communication passage 750 is connected to the air preheater 22, and a downstream side of the air flow is connected to the gap flow path formed in the outer cylinder 73. As a result, in the battery container 71, a part of the air that has passed through the air preheater 22 flows into the first temperature control flow path 230 formed in the inner cylinder 72, and the rest of the air flows into the second temperature control flow path 240 formed in the outer cylinder 73 through the communication passage 750.

The air flowing into the second temperature control flow path 240 receives heat from the cell stack CS and raises the temperature when passing through the communication passage 750. Therefore, in the battery container 71, air having a temperature lower than that of the air flowing through the second temperature control flow path 240 flows into the first temperature control flow path 230.

Further, unlike the second temperature control flow path 240, the air that has passed through the air preheater 22 flows into the first temperature control flow path 230 without passing through the communication passage 750. Therefore, in the battery container 71 of the present embodiment, the air having a higher flow velocity than the air flowing through the second temperature control flow path 240 flows into the first temperature control flow path 230.

The rest of the structure is similar to that of the first embodiment. The fuel cell module 1 of the present embodiment can obtain the same action and effect as those of the first embodiment, which are common to or equivalent to those of the first embodiment.

As described above, in the battery container 71, the air having a lower temperature than the air flowing through the second temperature control flow path 240 and having a higher flow velocity flows into the first temperature control flow path 230. Therefore, the difference between the amount of heat transfer due to convection inside the cell stack CS and the amount of heat transfer due to convection outside the cell stack CS becomes small, and the temperature distribution between the inner portion and the outer portion of the cell stack CS is reduced.

Modification of Third Embodiment

In the third embodiment, the second temperature control flow path 240 provided in the outer cylinder 73 is configured as a single flow path extending in the axial direction DRa, but the second temperature control flow path 240 is limited to this structure. As described in the second embodiment, the second temperature control flow path 240 may have a flow path structure having the outer flow path portion 242 and the inner flow path portion 241. The same also applies to the following embodiments.

In the third embodiment, the air that has passed through the air preheater 22 without passing through the communication passage 750 is allowed to flow into the first temperature control flow path 230, so that the air having a large flow velocity flows into the first temperature control flow path 230. However, the battery container 71 is not limited to this structure. The battery container 71 may be provided with, for example, a nozzle for accelerating the fluid flowing into the first temperature control flow path 230.

Fourth Embodiment

Next, a fourth embodiment will be described with reference to FIG. 11. In the present embodiment, differences from the third embodiment will be mainly described.

Figure 11:
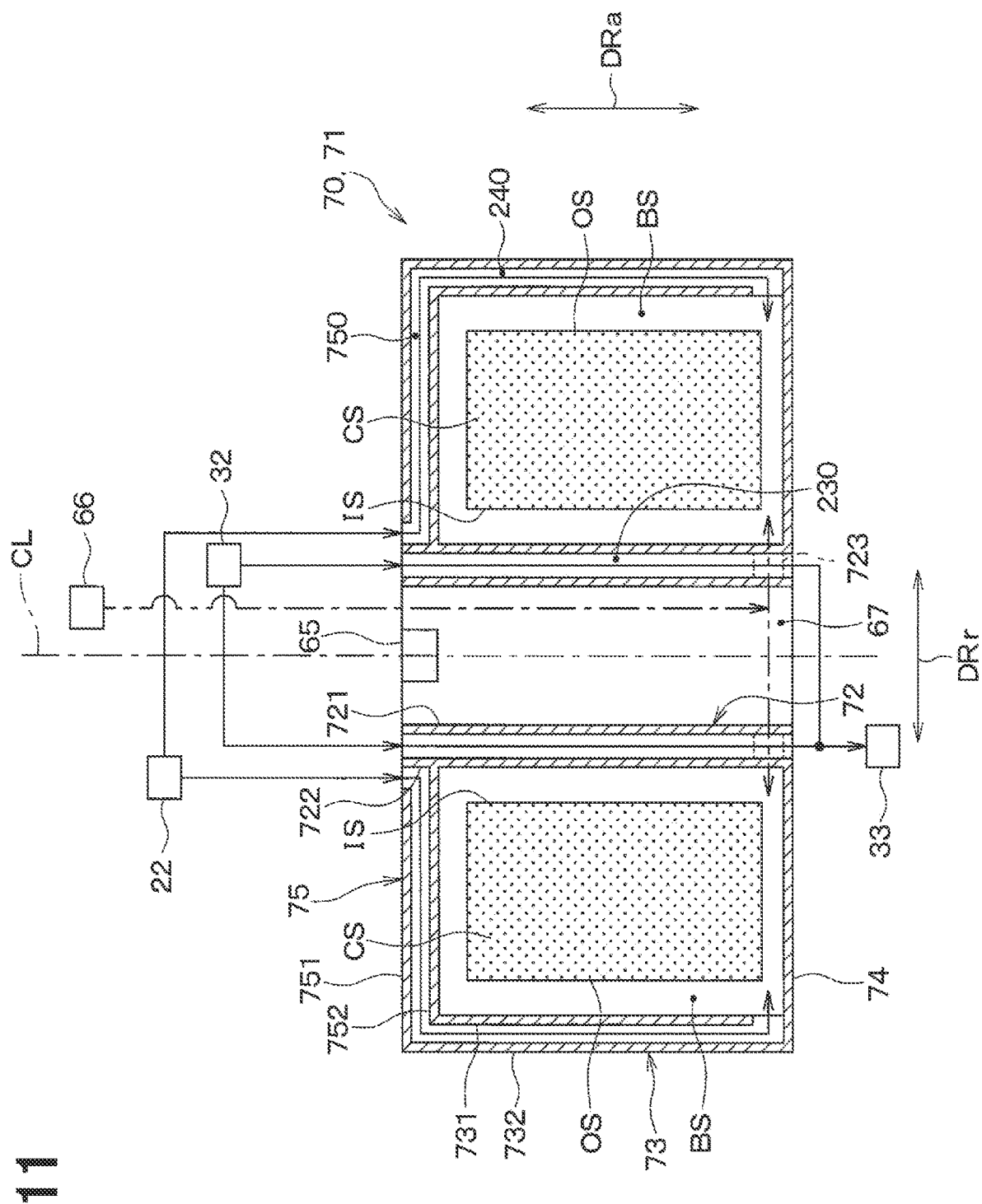
FIG. 11 is a schematic cross-sectional view of a battery container accommodating a cell stack according to a fourth embodiment.

As shown in FIG. 11, the battery container 71 is configured so that the mixed gas of the reforming raw material and the steam before being introduced into the reformer 33 flows into the first temperature control flow path 230 instead of the air flowing through the air path 20. The temperature of the mixed gas of the reforming raw material and the steam is lower than that of the air heated by the air preheater 22. Therefore, in the battery container 71, the mixed gas having a temperature lower than that of the air flowing through the second temperature control flow path 240 flows into the first temperature control flow path 230.

Further, unlike the second temperature control flow path 240 in which the air passing through the air preheater 22 flows through the communication passage 750, the mixed gas before being introduced into the reformer 33 flows into the first temperature control flow path 230 without passing through the communication passage 750. Therefore, in the battery container 71 of the present embodiment, the mixed gas having a flow velocity higher than that of the air flowing through the second temperature control flow path 240 flows into the first temperature control flow path 230.

The other configurations are the same as those of the third embodiment. The fuel cell module 1 of the present embodiment can obtain the same action and effect as those of the third embodiment, which are common to or equivalent to those of the third embodiment.

Modification of Fourth Embodiment

In the fourth embodiment, the air that has passed through the air preheater 22 flows into the second temperature control flow path 240, but the fluid flowing through the second temperature control flow path 240 is not limited to this configuration. The fluid flowing through the second temperature control flow path 240 may have a higher temperature than that of the first temperature control flow path 230. The second temperature control flow path 240 may be configured so that, for example, the fuel gas generated by the reformer 33 flows into the second temperature control flow path 240.

In the fourth embodiment, the mixed gas before being introduced into the reformer 33 is flowed into the first temperature control flow path 230 without passing through the communication passage 750, so that the mixed gas having a large flow velocity is flown to the first temperature control flow path 230. However, the battery container 71 is not limited to this structure. The battery container 71 may be provided with, for example, a nozzle for accelerating the fluid flowing into the first temperature control flow path 230. Further, the first temperature control flow path 230 itself may be configured to function as the reformer 33. Such a configuration can be realized, for example, by arranging a steam reforming catalyst in the first temperature control flow path 230 and flowing a mixed gas of the steam and the reforming raw material in the first temperature control flow path 230.

Fifth Embodiment

Next, a fifth embodiment will be described with reference to FIG. 12. In the present embodiment, differences from the third embodiment will be mainly described.

Figure 12:
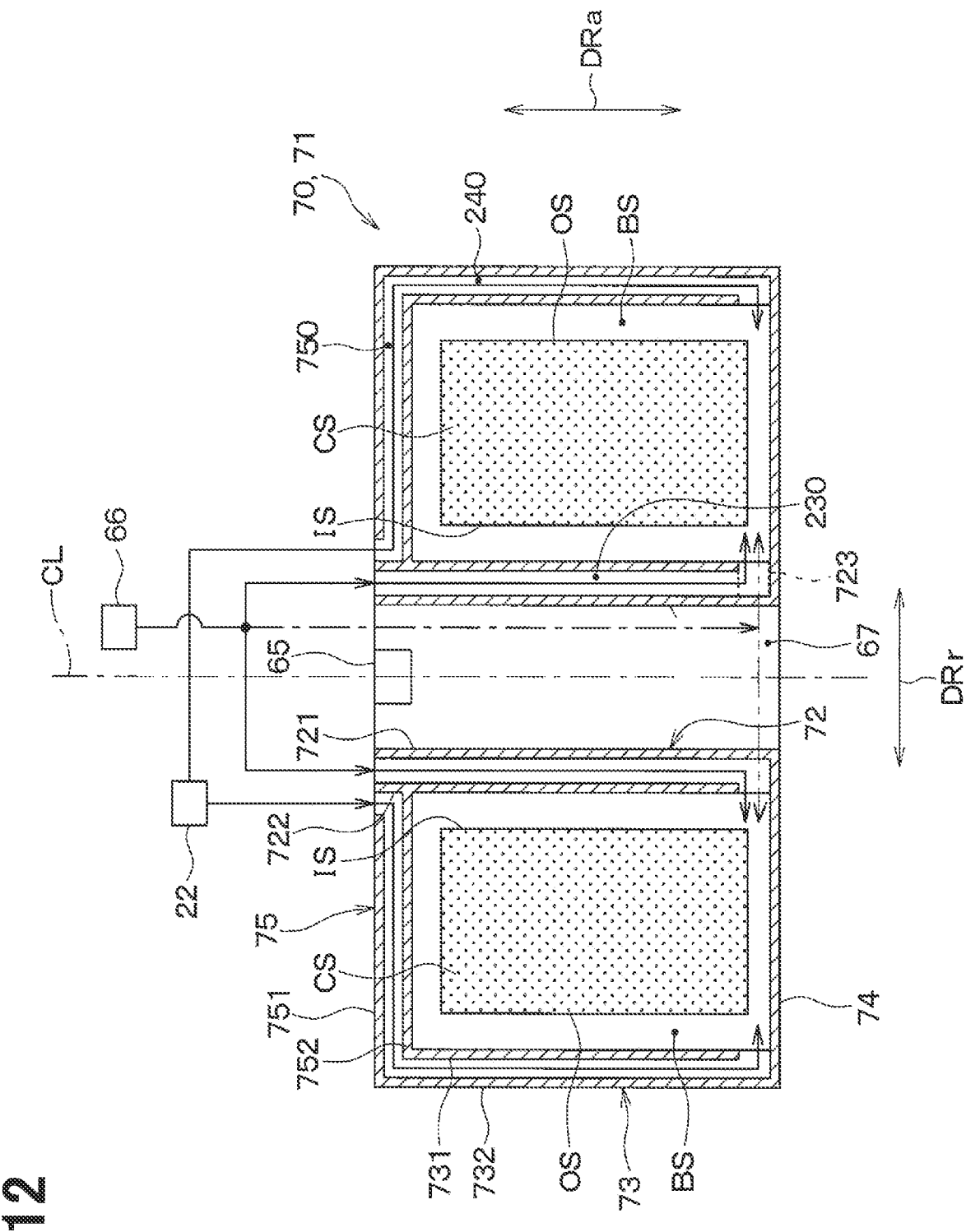
FIG. 12 is a schematic cross-sectional view of a battery container accommodating a cell stack according to a fifth embodiment.

As shown in FIG. 12, the battery container 71 is configured such that a part of the air blown from the starting blower 66 flows into the first temperature control flow path 230 instead of the air flowing through the air path 20. The temperature of the air blown from the starting blower 66 is lower than that of the air heated by the air preheater 22. Therefore, in the battery container 71, air having a temperature lower than that of the air flowing through the second temperature control flow path 240 flows into the first temperature control flow path 230.

Further, the first temperature control flow path 230 is different from the second temperature control flow path 240 in which the air that has passed through the air preheater 22 flows through the communication passage 750, from the starting blower 66 without going through the communication passage 750. The blown air flows in. Therefore, in the battery container 71 of the present embodiment, the mixed gas having a flow velocity higher than that of the air flowing through the second temperature control flow path 240 flows into the first temperature control flow path 230.

The other configurations are the same as those of the third embodiment. The fuel cell module 1 of the present embodiment can obtain the same action and effect as those of the third embodiment, which are common to or equivalent to those of the third embodiment.

Modification of Fifth Embodiment

In the fifth embodiment, the air blown from the starting blower 66 without passing through the communication passage 750 is allowed to flow into the first temperature control flow path 230, so that the air having a large flow velocity flows into the first temperature control flow path 230. However, the battery container 71 is not limited to this structure. The battery container 71 may be provided with, for example, a nozzle for accelerating the fluid flowing into the first temperature control flow path 230.

OTHER EMBODIMENTS

Although representative embodiments of the present disclosure have been described above, the present disclosure is not limited to the embodiments described above, and various modifications can be made, for example, as follows.

In the above-described embodiment, in the battery container 71, air or a mixed gas of the reforming raw material and the steam flows through the first temperature control flow path 230, and air or fuel gas flows through the second temperature control flow path 240. However, the battery container 71 is not limited to this structure. If the battery container 71 has a configuration in which the first fluid having a larger temperature difference with the cell stack CS or a larger flow velocity than the second fluid flowing through the second temperature control flow path 240 flows into the first temperature control flow path 230, as first fluid and the second fluid, a fluid other than air, a mixed gas, and a fuel gas may be adopted.

In the above-described embodiment, in the battery container 71, the air having low temperature and high flow velocity flows to the first temperature control flow path 230, which has a smaller heat transfer area with the cell stack CS than that of the second temperature control flow path 240. However, the battery container 71 is not limited to this structure.

In the battery container 71, for example, the flow path structure may be such that a fluid having a lower temperature than the fluid flowing through the second temperature control flow path 240 flows in the first temperature control flow path 230, and a fluid having the same flow velocity flows in each of the first temperature control flow path 230 and the second temperature control flow path 240.

On the contrary, in the battery container 71, for example, the flow path structure may be such that a fluid having the same temperature flows in each of the first temperature control flow path 230 and the second temperature control flow path 240, and a fluid having a flow velocity larger than that flowing through the temperature control flow path 240 flows in the first temperature control flow path 230.

In the above-described embodiment, the battery container 71 has a double cylinder structure in which a donut-shaped battery storage space BS is formed inside. However, the battery container 71 is not limited to this structure, and may have other than the double cylinder structure.

In the above-described embodiment, the battery container 71 is arranged in a posture extending along the vertical direction, but the arrangement posture of the battery container 71 is not limited to this structure. The battery container 71 may be arranged, for example, in a posture tilted with respect to the vertical direction.

In the above-described embodiment, the fuel cell 10 is arranged in another space insulated from the space in which the air preheater 22, the reformer 33, the water evaporator 42, the combustor 63, and the like are accommodated. The arrangement of the fuel cell 10 is not limited to this configuration. For example, the fuel cell 10 may be arranged in the same space as the space in which the air preheater 22, the reformer 33, the water evaporator 42, the combustor 63, and the like are accommodated.

In the above-described embodiment, the stacked end surfaces EF of the adjacent cell stacks CS are arranged in a posture facing each other, but the arrangement posture of the cell stacks CS is not limited to this configuration. For example, the cell stack CS may be arranged so that the side surface extending along the stacking direction DRst face the adjacent cell stack CS.

In the above-described embodiment, a plurality of cell stack CSs are radially arranged inside the battery container 71, but the fuel cell module 1 is not limited to this configuration. In the fuel cell module 1, a plurality of cells C may be radially arranged inside the battery container 71. In this case, the cell C corresponds to the cell member.

In the above-described embodiment, the warm-up gas flow path 67 is formed inside the first temperature control flow path 230 in the battery container 71, but the arrangement of the warm-up gas flow path 67 Is not limited to this configuration. The warm-up gas flow path 67 may be arranged other than inside of the first temperature control flow path 230.

In the above-described embodiment, the fuel gas and oxidant gas inlet is provided between adjacent cell stacks CS, but the arrangement of the inlet is not limited to this configuration. The fuel gas and oxidant gas inlet may be provided other than between adjacent cell stacks CS.

In the above-described embodiment, the fuel cell module 1 of the present disclosure is applied to a fuel cell system having the solid oxide fuel cell 10, but the application target of the fuel cell module 1 is not limited to this configuration. The fuel cell module 1 can be widely applied to a system including another fuel cell such as, for example, a fuel cell (that is, PEFC) having a solid electrolyte membrane.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

(Overview)

According to a first aspect shown in part or all of the above embodiments, the fuel cell module comprises a container and a plurality of cell members radially arranged inside the container. Inside the container, a first fluid flow path through which a first fluid that exchanges heat with an inner portion of the cell member flows is formed, and a second fluid flow path through which a second fluid that exchanges heat with an outer portion of the cell member flows is formed. A first heat exchange portion forming the first fluid flow path has a smaller heat transfer area with the cell member than a second heat exchange portion forming the second fluid flow path. Then, the first fluid having a larger temperature difference with the cell member than the second fluid flowing through the second fluid flow path flows in the first fluid flow path.

According to a second aspect, the first fluid having a temperature lower than that of the second fluid flowing through the second fluid flow path flows in the first fluid flow path when the cell member is cooled or kept warm.

If the first fluid having a temperature lower than that of the second fluid flows in the first fluid flow path when cooling or keeping warm the cell member, a difference between an amount of heat transfer due to convection in an inner portion of the cell member and an amount of heat transfer due to convection in an outer portion of the cell member becomes small. Therefore, it is possible to reduce the temperature distribution between the inner portion and the outer portion of the cell member when the cell member is cooled or kept warm.

According to a third aspect, the first fluid having a higher flow velocity than the second fluid flowing through the second fluid flow path flows in the first fluid flow path. In this way, since the first fluid having a flow velocity larger than that of the second fluid flows in the first fluid flow path having a smaller heat transfer area with the cell member than the second fluid flow path, a heat transfer coefficient of the first fluid flow path is larger than a heat transfer coefficient of the second fluid flow path. According to this configuration, the difference between the amount of heat transfer due to convection in the inner portion of the cell member and the amount of heat transfer due to convection in the outer portion becomes small, and it is possible to reduce the temperature distribution between the inner portion and the outer portion of the cell member.

According to a fourth aspect, the fuel cell module includes a container and a plurality of cell members radially arranged inside the container. Inside the container, a first fluid flow path through which a first fluid that exchanges heat with an inner portion of the cell member flows is formed, and a second fluid flow path through which a second fluid that exchanges heat with an outer portion of the cell member flows is formed. A first heat exchange portion forming the first fluid flow path has a smaller heat transfer area with the cell member than a second heat exchange portion forming the second fluid flow path. The first fluid having a higher flow velocity than the second fluid flowing through the second fluid flow path flows in the first fluid flow path.

According to a fifth aspect, the second fluid flow path has an inner flow path portion closer to the cell member and an outer flow path portion farther from the cell member than the inner flow path portion, and has a flow path structure in which the second fluid passed through the outer flow path portion is folded back and flows into the inner flow path portion.

If the heat transfer area of the second fluid flow path is larger than the heat transfer area of the first fluid flow path, the temperature difference between the upstream and the downstream of the second fluid flow path becomes large, and there is a risk that the temperature of the second fluid flow path becomes non-uniformity.

On the other hand, if the second fluid flow path has a flow path structure in which the second fluid is folded back and flows, the flows of the second fluid flow path face each other in the inner flow path portion and the outer flow path portion of the second fluid flow path. Therefore, the temperature in the inner flow path portion near the outer portion of the cell member is made uniform. As a result, temperature unevenness in the outer portion of the cell member is suppressed.

According to a sixth aspect, each of the plurality of cell members is configured as a cell stack in which a plurality of cells are stacked. In the adjacent cell stacks among the plurality of cell stacks, the stacked end surfaces located at the ends of the plurality of cells in the stacking direction are arranged so as to face each other.

In this way, if the stacked end surfaces of adjacent cell stacks face each other, one of the stacked end surfaces of the adjacent cell stacks receives heat from the other cell stack, so that the temperature distribution in the stacking direction of the cell member can be reduced.

According to a seventh aspect, a third fluid flow path capable of flowing a third fluid having a temperature different from that of the first fluid is provided inside the first fluid flow path in the container. As described above, if the flow path structure is such that the third fluid flow path is provided inside the first fluid flow path, even if the calorific value of the cell member increases for some reason, the third fluid having a temperature lower than that of the second fluid into the third fluid flow path so that it is possible to prevent the cell member from being excessively heated.

According to an eighth aspect, at least one of the fuel gas and the oxidant gas inlets is formed between the adjacent cell members among the plurality of cell members. In this way, if the inlet is formed between the adjacent cell members, the space formed between the adjacent cell members can be effectively used to supply the fuel gas or the oxidant gas. According to this configuration, the size of the container can be reduced as compared with the case where a space for supplying the fuel gas or the oxidant gas is separately provided.

What is claimed is:

1. A fuel cell module, comprising:
a battery container; and
a plurality of cell members radially arranged inside the battery container, wherein
the battery container includes an inner cylinder having a first double wall structure having a cylindrical first inner wall and a tubular first outer wall arranged radially inside the plurality of cell members, with a first fluid flow path being formed between the cylindrical first inner wall and the tubular first outer wall of the inner cylinder;
the battery container includes an outer cylinder having a second double wall structure having a cylindrical second inner wall and a tubular second outer wall arranged radially outside of the plurality of cell members, a second fluid flow path being formed between the cylindrical second inner wall and the tubular second outer wall of the outer cylinder;
air flowing in the first fluid flow path exchanges heat with a radially inner portion of a cell member of the plurality of cell members, and air flowing in the second fluid flow path exchanges heat with a radially outer portion of the cell member of the plurality of cell members;
a first heat exchange portion, formed by the first fluid flow path and that exchanges heat with the cell member, has a smaller heat transfer area with the cell member than a second heat exchange portion, formed by the second fluid flow path and that exchanges heat with the cell member;
air flowing in the first fluid flow path has a higher flow velocity than air flowing through the second fluid flow path; and
the first fluid flow path and second fluid flow path are configured such that air enters the first fluid flow path, flows through the first fluid flow path to the second fluid flow path, and enters the cell member of the plurality of cell members through a single inlet port.

2. The fuel cell module according to claim 1, wherein
the second fluid flow path has an inner flow path portion closer to the cell member and an outer flow path portion farther from the cell member than the inner flow path portion, and has a flow path structure in which the second fluid passed through the outer flow path portion is folded back and flows into the inner flow path portion.

3. The fuel cell module according to claim 1, wherein
each of the plurality of cell members is configured as a cell stack in which a plurality of cells are stacked, and
in the adjacent cell stacks among the plurality of cell stacks, the stacked end surfaces located at the ends of the plurality of cells in a stacking direction are arranged so as to face each other.

4. The fuel cell module according to claim 1, wherein a third fluid flow path which can flow a fluid of a temperature different from the air inside the first fluid flow path in the container.

5. The fuel cell module according to claim 1, wherein at least one inlet of a fuel gas and an oxidant gas is formed between the adjacent cell members among the plurality of cell members.

6. The fuel cell module according to claim 1, wherein the first fluid flow path has a smaller flow path cross-sectional area than that of the second fluid flow path.

* * * * *